(12) United States Patent
Kauffmann et al.

(10) Patent No.: US 10,438,632 B2
(45) Date of Patent: Oct. 8, 2019

(54) DIRECT USER MANIPULATION OF VIDEO TO GENERATE SCRUBBING VIDEOS

(71) Applicant: Google LLC, Mountain View, CA (US)

(72) Inventors: Alejandro Kauffmann, San Francisco, CA (US); Andrew Dahley, San Francisco, CA (US); Mark Ferdinand Bowers, San Francisco, CA (US); William Lindmeier, San Francisco, CA (US); Ashley Ma, San Francisco, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/169,947

(22) Filed: Oct. 24, 2018

(65) Prior Publication Data

US 2019/0130943 A1    May 2, 2019

Related U.S. Application Data

(60) Provisional application No. 62/579,664, filed on Oct. 31, 2017.

(51) Int. Cl.
  *G11B 27/031* (2006.01)
  *G06F 3/0488* (2013.01)

(52) U.S. Cl.
  CPC ........ *G11B 27/031* (2013.01); *G06F 3/04883* (2013.01); *G06F 2203/04808* (2013.01)

(58) Field of Classification Search
  CPC ....... G11B 27/00; G11B 27/031; G11B 27/34; G11B 27/034; G11B 27/02; H04N 21/47217; H04N 9/8205; H04N 21/47202; H04N 21/47205; H04N 21/4334; H04N 21/4316; H04N 21/8455; H04N 21/8456; H04N 5/262; H04N 21/440281; H04N 21/6587; H04N 21/854; H04N 5/77; H04N 5/4403; H04N 5/93; H04N 21/4126; H04N 21/4424; H04N 9/79; G06F 3/04842; G06F 3/048
  USPC ......... 386/223–224, 239–248, 343–352, 326
  See application file for complete search history.

(56) References Cited

U.S. PATENT DOCUMENTS

| | | | |
|---|---|---|---|
| 10,079,040 B2* | 9/2018 | Belliveau | G11B 27/031 |
| 2012/0050012 A1* | 3/2012 | Alsina | H04N 21/4126 340/10.1 |
| 2015/0058733 A1* | 2/2015 | Novikoff | G11B 27/031 715/723 |
| 2015/0264294 A1* | 9/2015 | Nichols | H04N 5/232 386/239 |

* cited by examiner

*Primary Examiner* — Hung Q Dang
(74) *Attorney, Agent, or Firm* — Dority & Manning, P.A.

(57) ABSTRACT

The present disclosure provides systems and methods that generate a scrubbing video that depicts a scrubbing operation performed on a first video. In particular, a user can directly manipulate video playback of the first video (e.g., by interacting with a touch-sensitive display screen) and the scrubbing video can depict such manipulation. As one example, the user can "scratch" his or her videos like a disc jockey (DJ) scratches records to produce scrubbing videos that are remixes (e.g., looping remixes) of his or her original videos. Thus, the systems and methods of the present disclosure enable a user to capture and edit a new type of video that allows the user to directly manipulate its timeline, producing fun and creative results.

20 Claims, 5 Drawing Sheets

DIRECT USER MANIPULATION OF VIDEO TO GENERATE SCRUBBING VIDEOS

RELATED APPLICATIONS

This application claims priority to and the benefit of U.S. Provisional Patent Application No. 62/579,664 filed on Oct. 31, 2017. U.S. Provisional Patent Application No. 62/579,664 is hereby incorporated by reference in its entirety.

FIELD

The present disclosure relates generally to generation of videos. More particularly, the present disclosure relates to systems and methods that enable a user to directly manipulate video playback of a first video to generate a scrubbing video that depicts scrubbing of the first video.

BACKGROUND

More and more individuals are using computing devices to capture, store, share, and interact with visual content such as photographs and videos. In particular, for some individuals, the primary medium in which they consume visual content such as photographs and videos is via a user computing device such as a smartphone or tablet.

Often, individuals capture and share visual content such as videos so that they can share their experiences with their friends, family, or other social network. For example, a user may use her smartphone to capture a video of her daughter to share with her brother.

When played back (e.g., by the user and/or her brother), the video may have a standard playback rate that depicts a scene over time, as captured by the device and experienced by the user. Stated differently, the video can be played back with a timeline that corresponds one-to-one with the actual progress of time in the scene so that the video reflects the user's perceptual experience.

While this traditional video playback may be desired in many circumstances, it represents a relatively conventional and non-interactive experience. That is, traditional standard playback of videos does not enable the user to creatively and interactively explore and manipulate playback of the video.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system includes one or more processors and one or more non-transitory computer-readable media that store instructions that, when executed by the one or more processors, cause the one or more processors to perform operations. The operations include obtaining a first video that comprises a first plurality of image frames. The operations include providing a first image frame of the first video for display in a user interface. The operations include receiving a user input that requests that a scrubbing operation be performed on the first video. The user input further requests generation of a second video that depicts a performance of the scrubbing operation on the first video. The operations include, in response to receipt of the user input, performing the scrubbing operation on the first video. Performing the scrubbing operation includes transitioning the user interface from display of the first image frame of the first video to display of at least a second image frame of the first video. The operations include generating the second video, wherein the second video depicts the performance of the scrubbing operation on the first video.

Another example aspect of the present disclosure is directed to a computer-implemented method. The method includes obtaining, by a computing system comprising one or more computing devices, a first video that comprises a first plurality of image frames. The method includes providing, by the computing system, a first image frame of the first video for display in a user interface. The method includes receiving, by the computing system, a user input that requests that a scrubbing operation be performed on the first video. The user input further requests generation of a second video that depicts a performance of the scrubbing operation on the first video. The method includes, in response to receipt of the user input, performing, by the computing system, the scrubbing operation on the first video. Performing, by the computing system, the scrubbing operation includes transitioning, by the computing system, the user interface from display of the first image frame of the first video to display of at least a second image frame of the first video. The method includes generating, by the computing system, the second video that depicts a performance of the scrubbing operation on the first video.

Another example aspect of the present disclosure is directed to a mobile computing device. The mobile computing device includes one or more processors and one or more non-transitory computer-readable media that store instructions that, when executed by the one or more processors, cause the one or more processors to perform operations. The operations include obtaining a first video that comprises a first plurality of image frames. The operations include providing a first image frame of the first video for display in a user interface. The operations include receiving a user input that requests that a scrubbing operation be performed on the first video. The user input further requests generation of a second video that depicts a performance of the scrubbing operation on the first video. The operations include, in response to receipt of the user input, performing the scrubbing operation on the first video. Performing the scrubbing operation includes transitioning the user interface from display of the first image frame of the first video to display of at least a second image frame of the first video. The operations include generating the second video that depicts a performance of the scrubbing operation on the first video.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
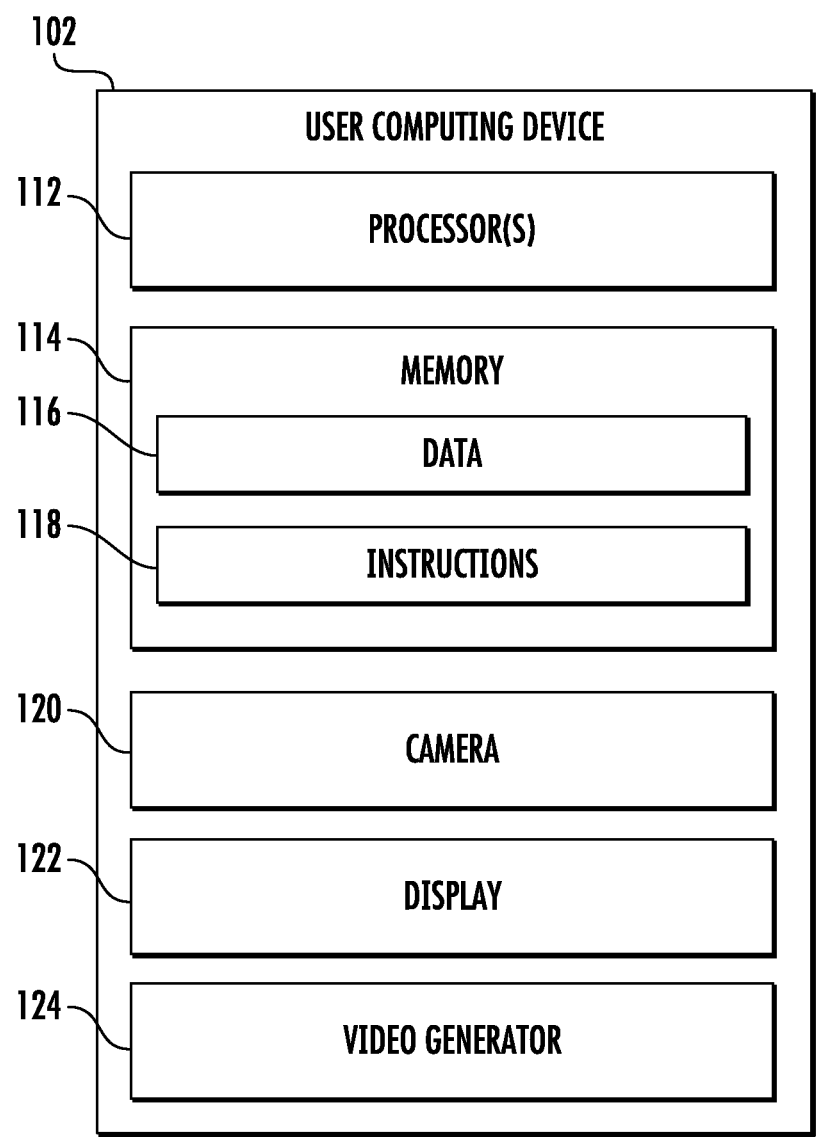
FIG. 1 depicts a block diagram of an example user computing device according to example embodiments of the present disclosure.

Generally, the present disclosure is directed to systems and methods that generate a scrubbing video that depicts a scrubbing operation performed on a source video. In particular, a user can directly manipulate video playback of the source video (e.g., by interacting with a touch-sensitive display screen) and the scrubbing video can depict such manipulation. As one example, the user can "scratch" his or her videos like a disc jockey (DJ) scratches records to produce scrubbing videos that are remixes (e.g., looping remixes) of his or her original videos. Thus, the systems and methods of the present disclosure enable a user to capture and edit a new type of video that allows the user to directly manipulate its timeline, producing fun and creative results. Furthermore, the systems and methods described herein can generate the scrubbing video using minimal computational resources, which can result in faster and more efficient execution relative to other video editing and generation systems. For example, in some implementations, the systems and methods described herein can be quickly performed on a user computing device such as, for example, a smartphone because of the reduced computational demands. As such, aspects of the present disclosure can improve accessibility to video editing and generation, including, for example, in scenarios in which cloud computing is unavailable or otherwise undesirable (e.g., for reasons of improving user privacy and/or reducing communication cost).

More particularly, aspects of the present disclosure provide video editing and generation methods implemented or otherwise executed by a computing system. In one example, the computing system includes a server computing device (e.g., an application server) that implements some or all of the methods described herein to generate scrubbing videos of original videos uploaded by a user via a user computing device (e.g., a smartphone) or otherwise accessed from a cloud storage location. As another example, the computing system can include a single computing device such as, for example, a user computing device (e.g., smartphone, tablet, personal assistant device, etc.), which can implement the methods described herein to generate scrubbing videos locally on the user device (e.g., without connectivity to a server computing device). The scrubbing videos can be provided to the user by, for example, displaying the scrubbing video on a display of the user computing device and/or storing the scrubbing video at a local memory of the user computing device and/or a cloud storage location.

According to one aspect of the present disclosure, a computing system can obtain a first video. The first video can include a first plurality of image frames. Each image frame can have a corresponding frame number. The first video can be a traditional video that depicts a scene over time.

As one example, the computing system can capture the first video explicitly for the purpose of allowing the user to directly manipulate playback of the first video and generate a scrubbing video. For example, a video or photo application can cooperatively operate with a camera to capture the first video. For example, a user of a smartphone can position the smartphone to capture the first video that depicts some scene of interest.

The first video can be permanently stored to a memory (e.g., non-volatile memory) or can be temporarily stored in memory (e.g., volatile memory such as RAM). For example, the first video can be temporarily stored solely for the purpose of enabling generation of the scrubbing video.

As another example, the first video can have been previously captured and stored. The computing system can obtain the first video by accessing it from its storage location. For example, a user can select a previously shot video from a gallery and the selected video can be loaded from memory.

After obtaining the first video (e.g., capturing the first video or selecting the first video from storage), the computing system can display the first video in the user interface so that the user can interact with and directly manipulate the first video. In particular, the computing system can provide a first image frame of the first video for display in a user interface. For example, the first image frame can be a start frame of the first video that has an earliest timestamp.

According to another aspect of the present disclosure, the computing system can receive a user input that requests that a scrubbing operation be performed on the first video. The user input can further request generation of a scrubbing video that depicts a performance of the scrubbing operation on the first video. Thus, various user inputs can be received by the computing system, including, for example, a certain user input that both requests a scrubbing operation and also generation of the scrubbing video that depicts a performance of the scrubbing operation on the first video.

In some implementations, the computing system can include a touch-sensitive display screen that displays the user interface. For example, the computing system can include a smartphone, tablet, or other user device that includes a touch-sensitive display screen. As such, in some implementations in which the computing system includes a touch-sensitive display screen, the user input can include a user touch action with respect to the touch-sensitive display screen. As one example, the user touch action can be or include a two-finger drag action.

In some implementations, an alternative user touch action can be used to request a scrubbing operation of the first video but not request generation of the scrubbing video. For example, in some implementations, the two-finger drag action described above can result in both scrubbing of the first video and generation of the scrubbing video while a one-finger drag action can result in scrubbing of the first video but not generation of the scrubbing video.

Thus, as an example, a user can use a one-finger drag action to scrub within or otherwise directly manipulate playback of the first video until a desired starting frame for the scrubbing video is reached and displayed within the user interface. Thereafter, the user can use a two-finger drag action to scrub within or otherwise directly manipulate playback of the first video while also requesting generation of the scrubbing video that depicts the scrubbing of the first video.

In some implementations, the computing system can be capable of receiving the user input at any location on the touch-sensitive display screen. In particular, in contrast to certain systems which enable scrubbing only along a timeline or progress bar, the systems and methods of the present disclosure can receive user input for scrubbing control at any location on the display screen.

In some implementations, the user input can request a scrubbing operation that includes both a forward chronological scrubbing and a reverse chronological scrubbing. For example, the user input can include a first portion that requests forward chronological scrubbing and a second, subsequent portion that requests reverse chronological scrubbing. For example, the user input can include a user drag action in a first direction and then a second, subsequent direction that is opposite to the first direction. As one example, the user can "scratch" her videos like a disc jockey (DJ) scratches records by dragging her fingers back and forth on the display screen. This form of input can request the scrubbing to correspondingly occur back and forth between forwards chronological scrubbing and backwards chronological scrubbing.

As a further example, again in contrast to certain systems which enable scrubbing only in one dimension along a timeline or progress bar, the systems and methods of the present disclosure can receive user input for scrubbing control in two dimensions (e.g., the two dimensions of the plane defined by the touch-sensitive display screen). In particular, in some implementations, any user input in the upwards and/or rightwards direction (e.g., relative to coordinates of the display screen) can be interpreted as a request to scrub in a forward chronological direction, while any user input in the downwards and/or leftwards direction (e.g., relative to coordinates of the display screen) can be interpreted as a request to scrub in a reverse chronological direction. Other correspondences between input directions and chronological scrubbing detections can be used as well, in addition or alternatively to the example correspondence described immediately above.

In some implementations, the user input can have an input duration. For example, in instances where the user input includes a user touch action, the input duration can correspond to an amount of time for which the user continuously provides the user touch action (e.g., maintains contact between her fingers and the display screen). Thus, in some examples, a user may request a scrubbing action in a forward chronological direction (e.g., by dragging two fingers rightward), pause for a certain period of time (by maintaining contact of her fingers with the display screen), and then request a scrubbing action in a reverse chronological direction (e.g., by dragging two fingers leftward). The entirety of this input can be a single user input that has an input duration corresponding to the entire time for which the user provided the input. As will be discussed further below, the length of the scrubbing video can correspond to (e.g., be at least as long as) the input duration associated with the user input.

In some implementations, the user input can have a momentum. For example, the momentum can correspond to a relative speed at which the user input (e.g., drag action) is provided. Thus, as an example, if a user drags her fingers quickly across the screen, such user input may have a relatively larger momentum than if the user drags her fingers slowly across the screen. In some implementations, the scrubbing operation performed on the first video in response to the user input can be performed at a speed that is correlated to the momentum of the user input. Thus, for example, a faster input (e.g., drag) can result in faster scrubbing (e.g., greater change in frames or timestamps per second) while a slower input (e.g., drag) can result in slower scrubbing (e.g., less change in frames or timestamps per second).

Furthermore, in some implementations, the user input can have a final momentum. In particular, the final momentum can be the momentum of the user input at the time at which the user input is ended. Thus, as an example, the final momentum can be the momentum at which the user's fingers are moving at the time the user lifts her fingers from the display screen. In some implementations, the scrubbing operation can include a wind down period that corresponds to a dissipation of the final momentum of the user input. Stated differently, the scrubbing operation can be implemented in the style of a carousel where the carousel continues spinning after the user has ended the input and until the final momentum is dissipated (e.g., according to some "friction" value that describes a rate at which momentum is dissipated).

In some implementations, the user input can include a portion where the user is not providing input for a certain period of time. For example, in some implementations, the user may discontinue input and then re-continue so long as the input is re-continued prior to dissipation of the momentum of the input. Thus, in one example, a user can perform a two-finger drag, left her fingers from the display screen, and then continue providing input by again placing her two fingers on the screen prior to the momentum of the user input fully dissipating.

According to another aspect of the present disclosure, in response to receipt of the user input, the computing system can perform the scrubbing operation on the first video. Performing the scrubbing operation can include transitioning the user interface from display of the first image frame of the first video to display of at least a second image frame of the first video. That is, rather than simply jumping to an end location of the scrub, the computing system can display each intermediate image frame sequentially until reaching an end frame of the scrub.

Thus, the first video can be scrubbed in a fashion that appears visually similar to normal playback of the first video, except performed according to a direction and momentum of the user input, which may, in some instances, be faster, slower, and/or chronologically reverse relative to normal playback of the first video. Stated differently, in some implementations, performing the scrubbing operation on the first video can include cinematically scrolling the image frames of the first video by sequentially displaying the image frames without translating the image frames relative to the display.

As described above, in some implementations, in response to any movement of the user touch action in a rightwards and/or upwards direction, the computing system can perform a forward chronological scrubbing. Likewise, in response to any movement of the user touch action in a leftwards and/or downwards direction, the computing system can perform a reverse chronological scrubbing. In some instances, a user input may request both a forward chronological scrubbing and a reverse chronological scrubbing and, in such instances, the scrubbing operation can include both forward scrubbing and reverse scrubbing (e.g., forward scrubbing to reverse scrubbing to forward scrubbing to reverse scrubbing, etc.).

In some implementations, the computing system can perform the scrubbing operation by transitioning the user interface from display of the first image frame to display of at least the second image frame for a transition duration that is at least as long as the input duration. Thus, the length of the scrubbing operation (e.g., transition duration) can directly correspond to the length of the user input (e.g., input duration). In such fashion, the user can be provided with control over how long the scrubbing operation is performed.

In some implementations, the transition duration can equal the input duration plus a wind down period that corresponds to a dissipation of the final momentum of the user input. Thus, the length of the scrubbing operation (e.g., transition duration) can directly correspond to the length of the user input (e.g., input duration) plus a wind down period in which the final momentum of the user input is dissipated. In such fashion, the user can be provided with control over how long the scrubbing operation is performed; including allowing for a final portion of the user input to continue the scrubbing operation for some time after the user input is ended. For example, the final portion of the user input can be a "flick" motion that causes scrubbing to continue in the specified direction.

In further implementations, the user can re-continue providing user input (e.g., after the flick motion described above) by again actively providing user input (e.g., placing her fingers on the display screen) prior to dissipation of the momentum. Thus, the input duration can be extended by re-continuing the user input.

In some implementations, the computing system can perform the scrubbing operation by transitioning the user interface from display of the first image frame to display of at least the second image frame at a speed that is positively correlated to the momentum of the user input. Thus, for example, a faster input (e.g., drag) can result in faster scrubbing (e.g., greater change in frames or timestamps per second) while a slower input (e.g., drag) can result in slower scrubbing (e.g., less change in frames or timestamps per second).

According to another aspect of the present disclosure, the computing system can generate a scrubbing video that depicts a performance of the scrubbing operation on the first video.

As described above, in some implementations, the scrubbing video depicts both the forward chronological scrubbing and the reverse chronological scrubbing; the scrubbing video can depict the transitioning of the user interface for the transition duration; and/or the scrubbing video can depict the transitioning from the first image frame to at least the second image frame at the speed that is positively correlated to the momentum of the user input.

In some implementations, the computing system can generate the scrubbing video by generating a record of a frame number and a display duration for each of the plurality of image frames that was displayed in the user interface during performance of the scrubbing operation. Stated differently, for each frame that is rendered to the screen, the computing system can check the current "progress" value and store that (e.g., into an array) if the system is in a record mode (e.g., the user input requests generation of the scrubbing video).

In some of such implementations, the scrubbing video can be generated by copying each frame indicated by the record and duplicating such frame until the display duration for such frame is reached. The corresponding video generated from such frames can be stored to memory (e.g., automatically or at the request of the user).

In other implementations, the computing system can wait until playback of the scrubbing video to completely generate the scrubbing video. In such implementations, at playback of the scrubbing video, the computing system can display each frame number for its corresponding display duration specified by the record. Stated differently, if the system is in playback mode (e.g., playback of the scrubbing video), an update can consult the record (e.g., an array) and set the progress.

Thus, in some implementations, the scrubbing video is not stored as a separate file but, instead, is generated in real-time during playback by accessing and displaying frames from the first video according to frame numbers and durations specified by the record. In some implementations, the scrubbing video is generated in real-time during an initial playback and if the user subsequently decides to store the scrubbing video it can be generated as a separate file and permanently stored.

According to another aspect, in some implementations, the first plurality of image frames of the first video includes both keyframe image frames and in-between image frames. Transitioning the user interface from display of the first image frame to display of at least the second image frame can include displaying at least one in-between image frame. For example, each frame in the scrubbed portion can be displayed, regardless of whether such frame is a keyframe or an in-between frame. The scrubbing video can include the at least one in-between image frame. Thus, both the displayed scrubbing and the corresponding scrubbing video are not limited to keyframes only but, instead, can include both keyframes and in-between frames. Thus, the visual quality of the scrubbing video can be equal to that of the first video.

The systems and methods of the present disclosure provide a number of technical effects and benefits. As one example, the systems and methods described herein can generate a scrubbing video using minimal computational resources, which can result in faster and more efficient execution relative to other video editing and generation systems. For example, in some implementations, the systems and methods described herein can be quickly performed on a user computing device such as, for example, a smartphone because of the reduced computational demands. As such, aspects of the present disclosure can improve accessibility to video editing and generation, including, for example, in scenarios in which cloud computing is unavailable or otherwise undesirable (e.g., for reasons of improving user privacy and/or reducing communication cost).

With reference now to the Figures, example embodiments of the present disclosure will be discussed in further detail.

Example Devices and Systems

FIG. 1 depicts a block diagram of an example user computing device 102 according to example embodiments of the present disclosure. The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. The user computing device 102 can generate scrubbing videos.

The user computing device 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the data 116 stored in memory 114 can include video data, such as sets image frames, audio tracks, etc. In some implementations, the data 116 stored in memory 114 can include a record of a scrubbing operation. For example, the record can describe a frame number for each frame that was displayed during a scrubbing operation. A duration of display can be provided for each frame number in the record. The frame numbers can repeat. The frame numbers can be recorded in a sequence that describes the order at which they were displayed.

The user computing device 102 can include a camera 120. The camera 120 can be operable to capture image frames (e.g., to form a video). In some implementations, the camera 120 can include one or more lenses, an image sensor, and/or an imaging pipeline. The image sensor can be a sensor that detects incoming light or other electromagnetic radiation and outputs data sufficient to generate an image of a scene. For example, the image sensor can be a CMOS sensor or a CCD sensor. In some implementations, the one or more lenses can include a wide angle lens such that images resulting from data output by the image sensor are wide angle images. However, in other implementations, no wide angle lens is used. The imaging pipeline can include one or more image processing components that are operable to process the raw data from the image sensor generate images. The imaging pipeline can also be referred to as an image processor (ISP). The camera can be front facing or rear facing. The device 102 can include one camera or multiple cameras.

The user computing device 102 can also include one or more user input components that receive user input. For example, the user input component can be a touch-sensitive component (e.g., a touch-sensitive display screen or a touch pad) that is sensitive to the touch of a user input object (e.g., a finger or a stylus). Other example user input components include a microphone, a mouse, a trackball, etc. The user input component can also include other components that are able to receive user input by way of motion of a user input object. For example, the user input component can track the motion of a user input object through computer vision systems that analyze imagery collected by the camera 120 of the device 102 or through the use of radar (e.g., miniature radar) to detect touchless gesture-based user input.

The user computing device 102 can also include a display 122. For example, the display 122 can be a touch-sensitive display screen. Thus, in some instances, the display 122 can be a user input component. As examples, the display 122 can be a liquid crystal display (LCD) or organic light-emitting diode (OLED) part of a touch screen, can be a non-touchscreen direct view display component such as a cathode ray tube (CRT), light-emitting diode (LED), LCD, or OLED. The display 122 can also be a projector instead of a direct view display.

The user computing device 102 can also include a video generator 124. The video generator 124 can implement some or all of any of the methods described herein to generate a scrubbing video. For example, the video generator 124 can implement some or all of method 400 described with reference with FIG. 4. In some implementations, the video generator 124 can include or be part of a video generation application.

The video generator 124 includes computer logic utilized to provide desired functionality. The video generator 124 can be implemented in hardware, firmware, and/or software controlling a general purpose processor. For example, in some implementations, the video generator 124 includes program files stored on a storage device, loaded into a memory and executed by one or more processors. In other implementations, the video generator 124 includes one or more sets of computer-executable instructions that are stored in a tangible computer-readable storage medium such as RAM hard disk or optical or magnetic media.

In some implementations, the user computing device 102 can communicate with a server computing system over a network. The server computing system can include one or more processors and a memory. In some implementations, the server computing system can include the video generator 124 in addition or alternatively to the user computing device 102

In some implementations, the server computing system includes or is otherwise implemented by one or more server computing devices. In instances in which the server computing system includes plural server computing devices, such server computing devices can operate according to sequential computing architectures, parallel computing architectures, or some combination thereof.

A network can be any type of communications network, such as a local area network (e.g., intranet), wide area network (e.g., Internet), or some combination thereof and can include any number of wired or wireless links. In general, communication over the network can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Example User Interfaces

FIGS. 2A-F depict example user interfaces according to example embodiments of the present disclosure. In particular, FIGS. 2A-F depict example user interfaces as shown on a smartphone. However, the user interfaces depicted in 2A-F are not limited to use with a smartphone but can be used, with or without modification, or any form of computing device that includes a display screen (e.g., a touch-sensitive display screen).

In some implementations, the user interfaces illustrated in FIGS. 2A-F can be used as part of or in conjunction with a video generation application. In some implementations, a launch page may be shown upon opening the application, which can contain, for example, branding or introductory visuals.

Figure 2A:
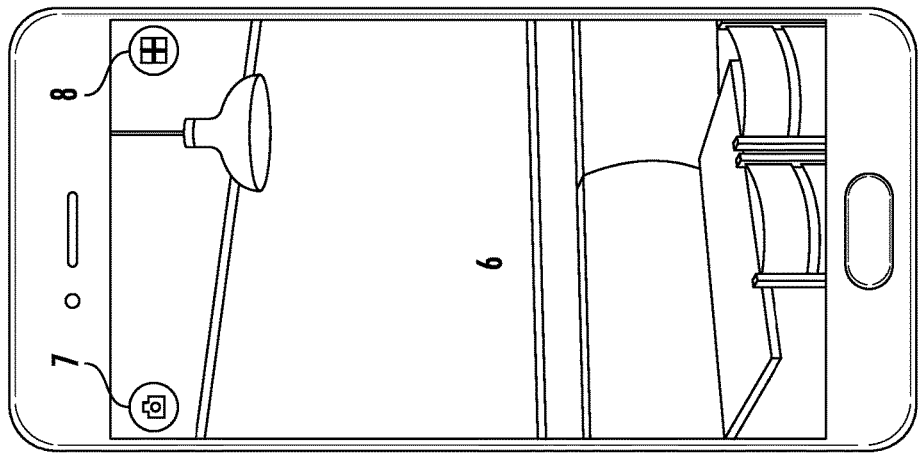
FIGS. 2A-F depict example user interfaces according to example embodiments of the present disclosure.

After the launch page has optionally been shown, the user interface can transition to a landing page, for example as shown in FIG. 2A. Referring to FIG. 2A, a user can interact (e.g., touch or otherwise select) with a record button 1 to start filming a new video. Alternatively, the user can interact (e.g., touch or otherwise select) with a gallery button 2 to access a gallery and select a previously shot video.

Figure 2B:
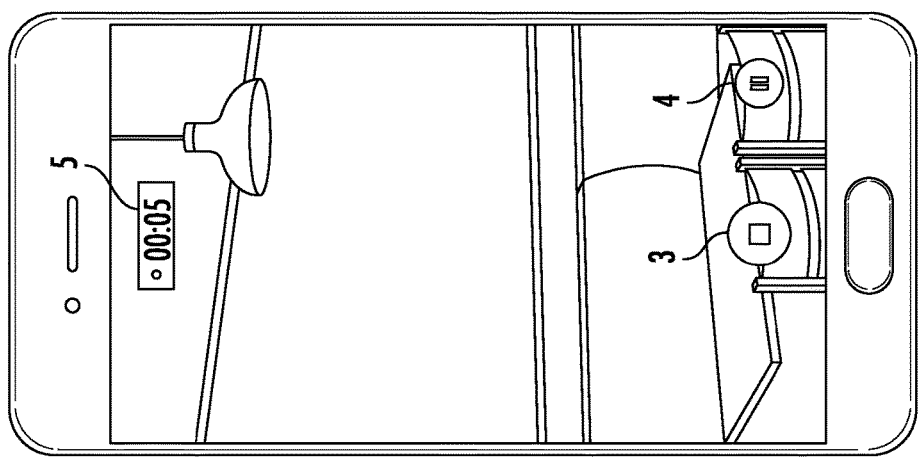

If the user selects the record button 1, the computing device can begin recording a new video and the user interface can transition to a recording page, for example as shown in FIG. 2B. Referring to FIG. 2B, a user can stop the recording by interacting (e.g., touching or otherwise selecting) with a stop button 3. Alternatively, the user can interact with a pause button 4 to temporarily stop filming before resuming. A total elapsed recorded time bar 5 can be shown at the top of the user interface.

Figure 2C:
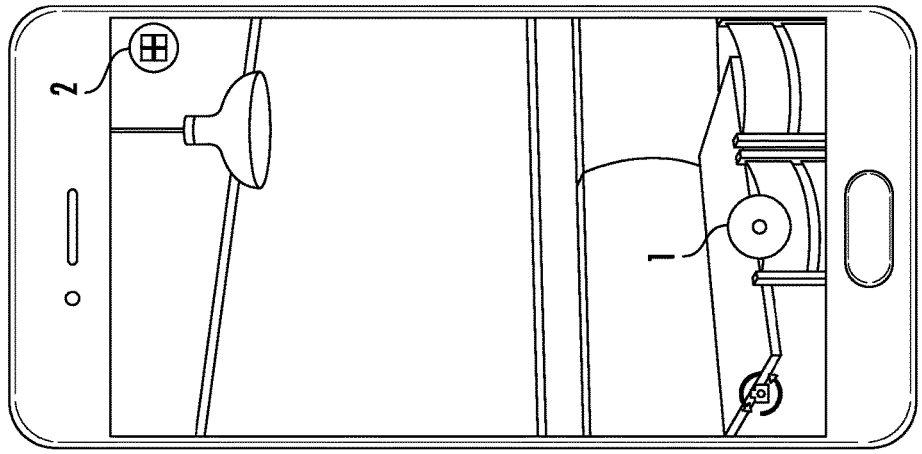

After capturing a new video or selecting a video from the gallery, the user interface can transition to a scrubbing page, for example, as shown in FIG. 2C. Referring to FIG. 2C, a user can scrub the video by performing a user action anywhere on the video display area 6. For example, a one-finger drag on the display area 6 can result in scrubbing through the footage without generating an additional video. Additionally, the user can return to the camera (or landing page) by interacting with the camera button 7 or return to the gallery by interacting with the gallery button 8.

Figure 2F:
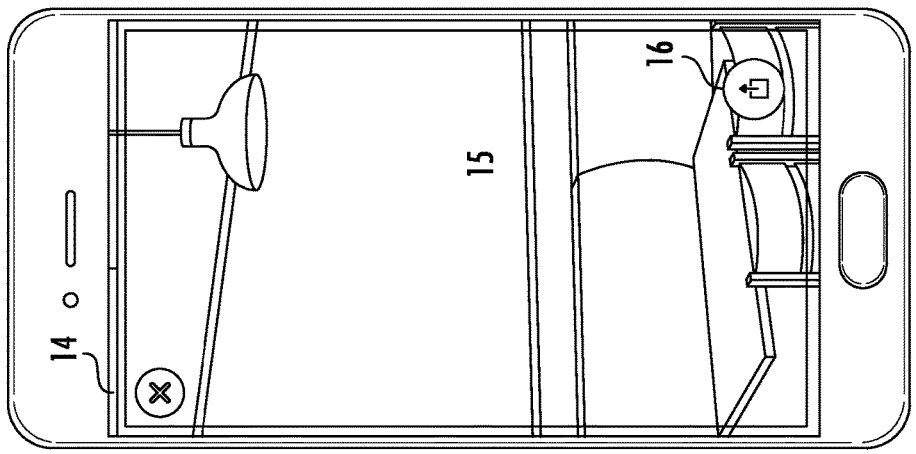

If the user performs a certain user action on the display area 6 (e.g., a two-finger drag on the display area 6), the user interface can begin scrubbing through the video and can also generate a scrubbing video based on the scrubbing. If the user performs the certain user action, the user interface can transition to a recording page, for example, as shown in FIG. 2D. Referring to FIG. 2D, upon performing the certain user action (e.g., two-finger drag action), the video can be scrubbed within the user interface and also a record bar 9 can appear at the top and indicate record mode.

Figure 2E:
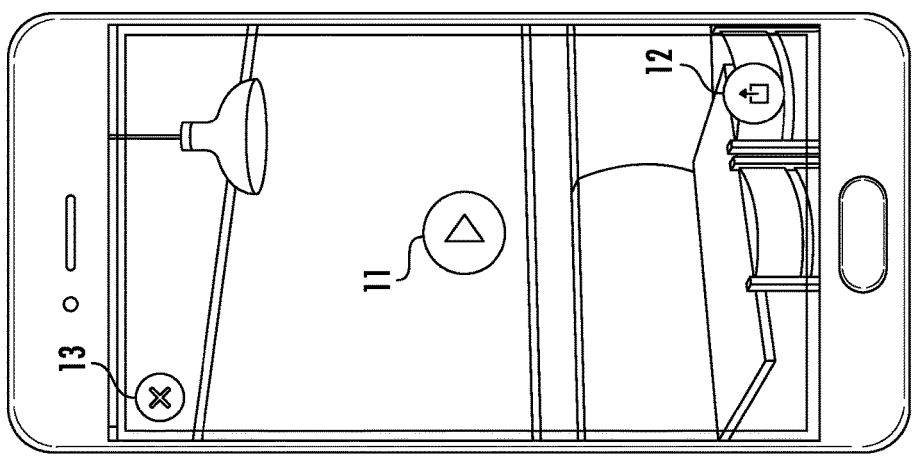
Figure 2D:
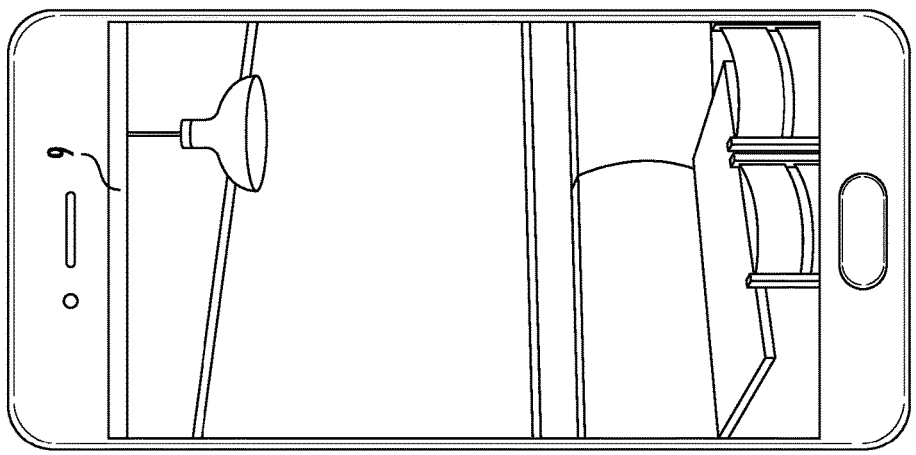

In some implementations, once the user input has stopped and/or momentum of the user input has dissipated, the scrubbing video can stop recording and the user interface can transition into a scrubbing video view, for example as shown in FIG. 2E.

Referring to FIG. 2E, in some implementations, the scrubbing video is not automatically played but instead the user can interact with (e.g., tap or otherwise select) a play button 11 or, optionally, anywhere else on the display area to play the scrubbing video. A user can interact with a share button 12 to share the scrubbing video or a close button 13 to close the scrubbing video.

In some implementations, if the user interacts with the close button 13 prior to interacting with the share button 12, the scrubbing video is not permanently stored and in fact, in some implementations, can be discarded altogether (e.g., a record of the scrubbing operation can be deleted from a temporary memory location). In some implementations, if the scrubbing video is discarded altogether, the first video can be discarded as well.

In some implementations, if the scrubbing video is played through interaction with the play button 11, the scrubbing video is generated in real-time based on a record of the scrubbing action without permanently storing the scrubbing video. Thus, in some implementations, at initial playback prior to storage and/or sharing, the scrubbing video is not a separate video file but instead is generated in real-time by accessing certain frame numbers from the first video file.

FIG. 2F depicts a playback user interface in which a scrubbing video is played back (e.g., as a result of the user interacting with the play button 11). As shown in FIG. 2F, the user interface can include a duration playback bar 14 at the top that shows the progress/duration of playback of the scrubbing video. In some implementations, swiping the display area 15 (e.g., swiping the video "off the screen") in any direction can result in the scrubbing video being discarded. A user can interact with a share button 16 to share the scrubbing video.

In some implementations, if the user interacts with the share button 12 of FIG. 2E or the share button 16 of FIG. 2F, the scrubbing video can be more fully generated and made available for sharing (e.g., via email, social media, text messaging, etc.) and/or permanent storage (e.g., in a camera roll, local storage file, cloud storage location, etc.). For example, rather than being generated in real-time based on the record of the scrubbing operation, the scrubbing video can be processed and generated by copying certain frame numbers for specified durations from the first video to generate a second, separate video file.

FIGS. 3A-D depict example user interfaces according to example embodiments of the present disclosure. In particular, FIGS. 3A-D depict example user interfaces as shown on a smartphone. However, the user interfaces depicted in 3A-D are not limited to use with a smartphone but can be used, with or without modification, or any form of computing device that includes a display screen (e.g., a touch-sensitive display screen).

In some implementations, the user interfaces illustrated in FIGS. 3A-D can be used as part of or in conjunction with a video generation application. In particular, the user interfaces illustrated in FIGS. 3A-D can be used as part of a tutorial mode of the video generation application. The tutorial mode can be provided at a first instance in which the video generation application is used and/or can be accessed from a menu.

Figure 3D:
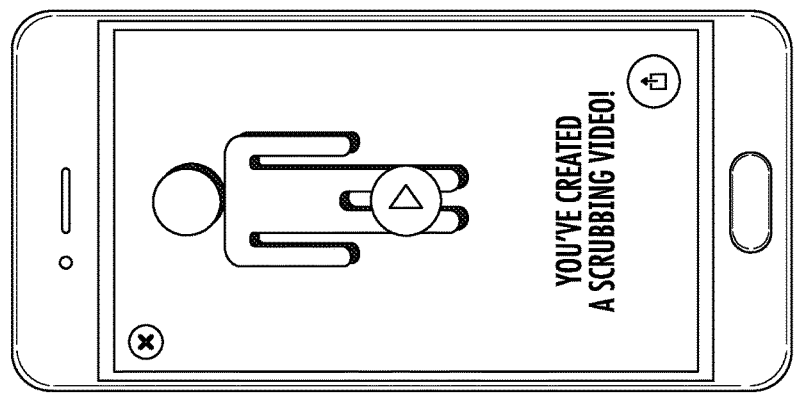
FIGS. 3A-D depict example user interfaces according to example embodiments of the present disclosure.
Figure 3C:
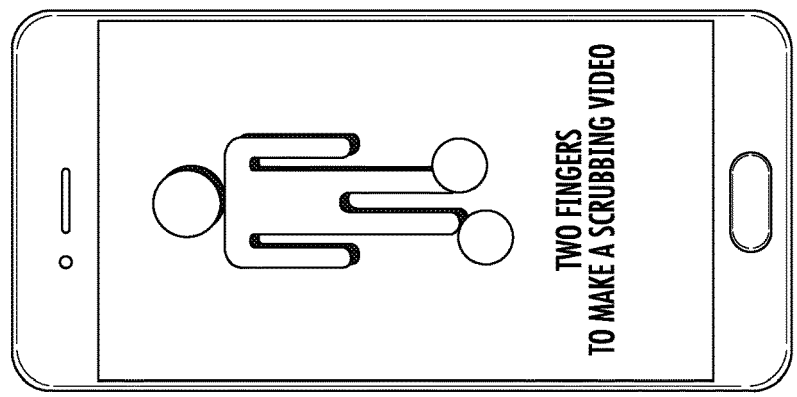
Figure 3B:
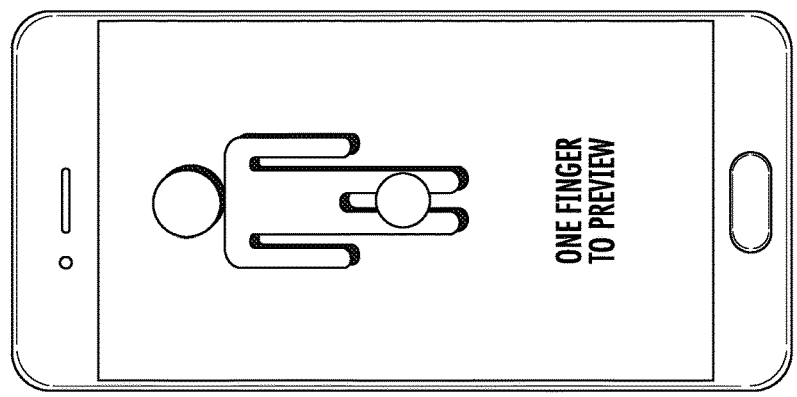
Figure 3A:
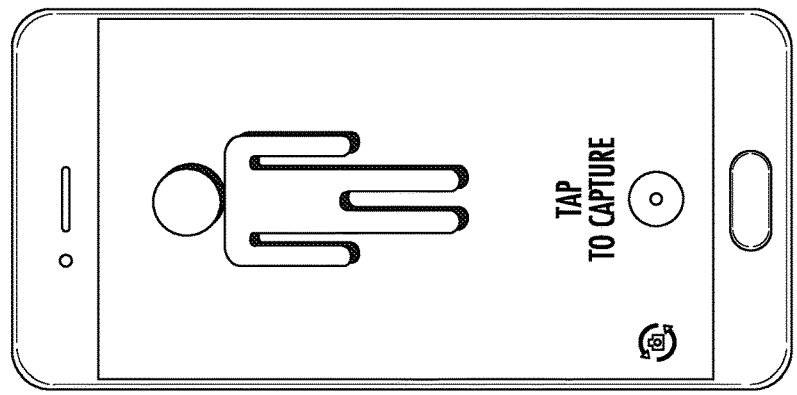

After a launch page has optionally been shown, the user interface can transition to a tutorial landing page, for example, as illustrated in FIG. 3A. Referring to FIG. 3A, the user interface can provide a tap to capture prompt, which encourages the user to shoot footage.

Referring now to FIG. 3B, once the user has captured her footage, the user interface can include a one finger to preview prompt that encourages the user to use one finger move (e.g., scrub) through the footage.

Referring now to FIG. 3C, following the one finger action, the user interface can include a two finger prompt that encourages the user to use two fingers to make a scrubbing video, where she begins recording when her two fingers touch down and, optionally, start moving.

Referring now to FIG. 3D, when the user lets her two fingers off the screen, her scrubbing video will appear. The user can tap play to dismiss the textual hint displayed on the screen.

Example Methods

Figure 4:
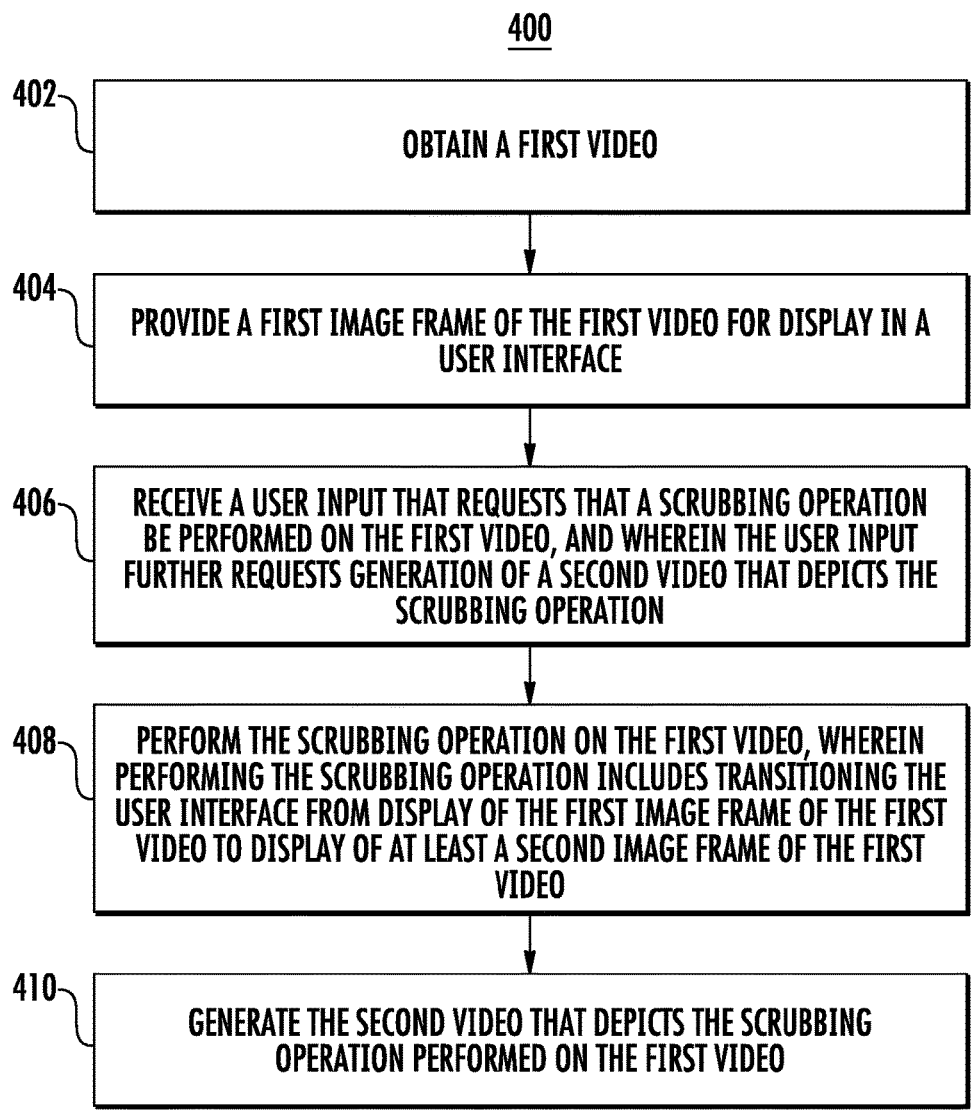
FIG. 4 depicts a flow chart diagram of an example method to generate a scrubbing video according to example embodiments of the present disclosure.

FIG. 4 depicts a flow chart diagram of an example method 400 to generate a scrubbing video according to example embodiments of the present disclosure.

At 402, a computing system can obtain a first video. For example, the first video can be newly captured or accessed from memory. The first video can include a first plurality of image frames. For example, in some implementations, the first plurality of image frames of the first video can include both keyframe image frames and in-between image frames At 404, the computing system can provide a first image frame of the first video for display in a user interface. For example, the first image frame can be a start image frame of the first video or can be an intermediate frame navigated to by the user.

At 406, the computing system can receive a user input that requests a scrubbing operation be performed on the first video. The user input can further request generation of a second video that depicts a performance of the scrubbing operation on the first video.

In some implementations, the user input has a momentum, an input duration, and/or a final momentum. In some implementations, the user input can request a scrubbing operation that includes both a forward chronological scrubbing and a reverse chronological scrubbing.

In some implementations, the user input can include a user touch action performed with respect to a touch-sensitive display screen. In some implementations, the user touch action can be a two-finger drag action.

At 408, the computing system can perform the scrubbing operation on the first video. Performing the scrubbing operation can include transitioning the user interface from display of the first image frame of the first video to display of at least a second image frame of the first video.

In some implementations, at 408, the computing system can transition the user interface from display of the first image frame to display of at least the second image frame at a speed that is positively correlated to the momentum of the user input.

In some implementations, at 408, the computing system can transition the user interface from display of the first image frame to display of at least the second image frame for a transition duration that is at least as long as the input duration. In some implementations, the transition duration can include the input duration plus a wind down period that corresponds to a dissipation of the final momentum of the user input.

In some implementations, performing the scrubbing operation at 408 can include: in response to any movement of the user touch action in a rightwards or upwards direction, performing a forward chronological scrubbing; and, in response to any movement of the user touch action in a rightwards or upwards direction, performing a forward chronological scrubbing.

In some implementations, performing the scrubbing operation at 408 can include displaying at least one in-between image frame.

At 410, the computing system can generate the second video that depicts a performance of the scrubbing operation on the first video.

In some implementations, the second video can depict the transitioning from the first image frame to at least the second image frame at the speed that is positively correlated to the momentum of the user input.

In some implementations, the second video can depict the transitioning of the user interface for the transition duration.

In some implementations, the second video can depict both forward chronological scrubbing and reverse chronological scrubbing.

In some implementations, the second video can include both keyframes and in-between image frames from the first video.

In some implementations, generating the second video at 410 can include generating a record of a frame number and a display duration for each of the plurality of image frames that was displayed in the user interface during performance of the scrubbing operation.

In some implementations, generating the second video at 410 can further include, at playback of the second video, displaying each frame number for its corresponding display duration specified by the record.

In some implementations, generating the second video at 410 can include copying each frame indicated by the record and duplicating such frame until the display duration for such frame is reached. The second video can be displayed to a user, shared, and/or stored in memory.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 4 and 5 respectively depict steps performed in a particular order for purposes of illustration and discussion, the methods of the present disclosure are not limited to the particularly illustrated order or arrangement. The various steps of the methods 400 and 500 can be omitted, rearranged, combined, and/or adapted in various ways without deviating from the scope of the present disclosure.

What is claimed is:

1. A computing system comprising:
   one or more processors; and
   one or more non-transitory computer-readable media that store instructions that, when executed by the one or more processors, cause the one or more processors to perform operations, the operations comprising:
   obtaining a first video that comprises a first plurality of image frames;
   providing a first image frame of the first video for display in a user interface;
   receiving a user input that requests that a scrubbing operation be performed on the first video, and wherein the user input further requests generation of a second video that depicts a performance of the scrubbing operation on the first video;
   in response to receipt of the user input, performing the scrubbing operation on the first video, wherein performing the scrubbing operation comprises transitioning the user interface from display of the first image frame of the first video to display of at least a second image frame of the first video; and
   generating the second video, wherein the second video depicts the performance of the scrubbing operation on the first video.

2. The computing system of claim 1, wherein:
   the user input has a momentum;
   performing the scrubbing operation comprises transitioning the user interface from display of the first image frame to display of at least the second image frame at a speed that is positively correlated to the momentum of the user input; and
   the second video depicts the transitioning from the first image frame to at least the second image frame at the speed that is positively correlated to the momentum of the user input.

3. The computing system of claim 1, wherein:
   the user input has an input duration;
   performing the scrubbing operation comprises transitioning the user interface from display of the first image frame to display of at least the second image frame for a transition duration that is at least as long as the input duration; and
   the second video depicts the transitioning of the user interface for the transition duration.

4. The computing system of claim 3, wherein:
the user input has a final momentum; and
the transition duration comprises the input duration plus a wind down period that corresponds to a dissipation of the final momentum of the user input.

5. The computing system of claim 1, wherein:
the user input requests the scrubbing operation that includes both a forward chronological scrubbing and a reverse chronological scrubbing; and
the second video depicts both the forward chronological scrubbing and the reverse chronological scrubbing.

6. The computing system of claim 1, further comprising:
a touch-sensitive display screen that displays the user interface;
wherein the user input comprises a user touch action with respect to the touch-sensitive display screen.

7. The computing system of claim 6, wherein the computing system is capable of receiving the user input at an entirety of a display area of the touch-sensitive display screen associated with display of the first video.

8. The computing system of claim 6, wherein the user touch action with respect to the touch-sensitive display screen comprises a two-finger drag action.

9. The computing system of claim 8, wherein, in response to a one-finger drag action, the computing system is configured to perform a second scrubbing operation without generating a third video.

10. The computing system of claim 6, wherein performing the scrubbing operation comprises:
in response to movement of the user touch action in a rightwards or upwards direction, performing a forward chronological scrubbing; and
in response to movement of the user touch action in a rightwards or upwards direction, performing a forward chronological scrubbing.

11. The computing system of claim 6, wherein the computing system consists of a user computing device that includes the one or more processors, the one or more or more non-transitory computer-readable media, and the touch-sensitive display screen, wherein the user computing device comprises a smartphone or a tablet.

12. The computing system of claim 1, wherein:
the first plurality of image frames of the first video comprises both keyframe image frames and in-between image frames;
transitioning the user interface from display of the first image frame to display of at least the second image frame comprises displaying at least one in-between image frame; and
the second video comprises the at least one in-between image frame.

13. The computing system of claim 1, wherein generating the second video comprises generating a record of a frame number and a display duration for each of the first plurality of image frames that was displayed in the user interface during performance of the scrubbing operation.

14. The computing system of claim 13, wherein generating the second video further comprises, at playback of the second video, displaying each frame number for its corresponding display duration specified by the record.

15. A computer-implemented method, comprising
obtaining, by a computing system comprising one or more computing devices, a first video that comprises a first plurality of image frames;
providing, by the computing system, a first image frame of the first video for display in a user interface;
receiving, by the computing system, a user input that requests that a scrubbing operation be performed on the first video, and wherein the user input further requests generation of a second video that depicts a performance of the scrubbing operation on the first video;
in response to receipt of the user input, performing, by the computing system, the scrubbing operation on the first video, wherein performing, by the computing system, the scrubbing operation comprises transitioning, by the computing system, the user interface from display of the first image frame of the first video to display of at least a second image frame of the first video; and
generating, by the computing system, the second video that depicts a performance of the scrubbing operation on the first video.

16. The computer-implemented method of claim 15, wherein:
receiving, by the computing system, the user input comprises receiving, by the computing system, the user input that requests the scrubbing operation that includes both a forward chronological scrubbing and a reverse chronological scrubbing; and
generating, by the computing system, the second video comprises generating, by the computing system, the second video that depicts both the forward chronological scrubbing and the reverse chronological scrubbing.

17. The computer-implemented method of claim 15, wherein receiving, by the computing system, the user input comprises receiving, by the computing system, the user input that comprises a two-finger drag action.

18. The computer-implemented method of claim 15, wherein performing, by the computing system, the scrubbing operation comprises:
in response to movement of the user input in a rightwards or upwards direction, performing, by the computing system, a forward chronological scrubbing; and
in response to movement of the user input in a rightwards or upwards direction, performing, by the computing system, a forward chronological scrubbing.

19. The computer-implemented method of claim 15, wherein:
receiving, by the computing system, the user input comprises receiving, by the computing system, the user input that has a momentum;
performing, by the computing system, the scrubbing operation comprises transitioning, by the computing system, the user interface from display of the first image frame to display of at least the second image frame at a speed that is positively correlated to the momentum of the user input; and
generating, by the computing system, the second video comprises generating, by the computing system, the second video that depicts the transitioning from the first image frame to at least the second image frame at the speed that is positively correlated to the momentum of the user input.

20. A mobile computing device, comprising:
one or more processors; and
one or more non-transitory computer-readable media that store instructions that, when executed by the one or more processors, cause the one or more processors to perform operations, the operations comprising:
obtaining a first video that comprises a first plurality of image frames;
providing a first image frame of the first video for display in a user interface;

receiving a user input that requests that a scrubbing operation be performed on the first video, and wherein the user input further requests generation of a second video that depicts a performance of the scrubbing operation on the first video;

in response to receipt of the user input, performing the scrubbing operation on the first video, wherein performing the scrubbing operation comprises transitioning the user interface from display of the first image frame of the first video to display of at least a second image frame of the first video; and generating the second video that depicts a performance of the scrubbing operation on the first video.

* * * * *